US009418765B2

(12) United States Patent
Lounsbury

(10) Patent No.: US 9,418,765 B2
(45) Date of Patent: Aug. 16, 2016

(54) NUCLEAR REACTOR CORES COMPRISING A PLURALITY OF FUEL ELEMENTS, AND FUEL ELEMENTS FOR USE THEREIN

(71) Applicant: Roger Ian Lounsbury, Deep River, CA (US)

(72) Inventor: Roger Ian Lounsbury, Deep River, CA (US)

(73) Assignee: Roger Ian LOUNSBURY, Deep River, Ontario (CA)

( * ) Notice: Subject to any disclaimer, the term of this patent is extended or adjusted under 35 U.S.C. 154(b) by 705 days.

(21) Appl. No.: 13/829,812

(22) Filed: Mar. 14, 2013

(65) Prior Publication Data

US 2014/0270045 A1 Sep. 18, 2014

(51) Int. Cl.
| | |
|---|---|
| *G21C 3/00* | (2006.01) |
| *G21C 3/322* | (2006.01) |
| *G21C 15/18* | (2006.01) |
| *G21C 3/07* | (2006.01) |
| *G21C 1/20* | (2006.01) |

(52) U.S. Cl.
CPC ....... *G21C 3/322* (2013.01); *G21C 3/07* (2013.01); *G21C 15/18* (2013.01); *G21C 1/20* (2013.01); *Y02E 30/38* (2013.01)

(58) Field of Classification Search
CPC .............. G21C 1/10; G21C 3/06; G21C 3/07; G21C 3/10; G21C 3/33
USPC ......................................................... 376/412
See application file for complete search history.

(56) References Cited

U.S. PATENT DOCUMENTS

| | | | | |
|---|---|---|---|---|
| 3,223,591 | A | * | 12/1965 | McLafferty .............. G21C 1/00 165/133 |
| 3,228,848 | A | * | 1/1966 | Fellows ........................ 376/323 |
| 3,308,031 | A | * | 3/1967 | Pon .............................. 376/370 |

(Continued)

FOREIGN PATENT DOCUMENTS

| | | |
|---|---|---|
| CA | 679279 | 4/1964 |
| CA | 738540 | 4/1964 |

(Continued)

OTHER PUBLICATIONS

Mildner et al., "The Neutron Transmission of Single-Crystal Sapphire Filters" J. Appl. Cryst. (1993), 26, pp. 438-447.*

(Continued)

*Primary Examiner* — Jack W Keith
*Assistant Examiner* — Sharon M Davis
(74) *Attorney, Agent, or Firm* — Adrian Zahl; Ridout & Maybee LLP

(57) ABSTRACT

In a nuclear reactor core, each of a plurality of pressure tubes contains fuel elements spaced apart to permit coolant to flow through spaces between adjacent fuel elements. Each fuel element comprises fuel pellets in cladding, e.g., sapphire, having a melting temperature of at least 1900° C. and does not form significant hydrogen if exposed to high temperature steam. Each pressure tube has an internal insulator sleeve, e.g., fused silica, that has relatively low thermal conductivity over a range of normal operating temperatures and relatively high thermal radiation transmission at temperatures higher than said normal operating temperature range. When coolant is absent from said spaces, the insulator sleeve transmits to the pressure tube at least about 10%, but preferably more than about 40% of thermal radiation from the fuel for conduction through the pressure tube to the moderator and fuel temperature remains within safe limits after the reactor is shut down.

23 Claims, 10 Drawing Sheets

(56) References Cited

U.S. PATENT DOCUMENTS

| | | | |
|---|---|---|---|
| 4,112,977 A | | 9/1978 | Syred et al. |
| 4,865,804 A | * | 9/1989 | McGeary et al. ............. 376/451 |
| 5,303,275 A | | 4/1994 | Kobsa |

FOREIGN PATENT DOCUMENTS

| | | |
|---|---|---|
| CA | 738541 | 12/1966 |
| CA | 738542 | 12/1966 |
| CA | 738543 | 12/1966 |
| CA | 903386 | 6/1972 |
| CA | 1044822 | 12/1978 |
| CA | 1111579 | 10/1981 |
| CA | 1174377 | 9/1984 |
| CA | 1192679 | 8/1985 |
| CA | 1244854 | 11/1988 |
| CA | 2032810 | 6/1992 |
| CA | 2037418 | 9/1992 |
| CA | 1318729 | 6/1993 |
| CA | 2000741 | 10/1994 |
| CA | 2124908 | 12/1994 |
| CA | 2352914 | 1/2002 |
| CA | 2380909 | 10/2003 |
| CA | 2533625 | 7/2007 |
| WO | 03/088263 | 10/2003 |

OTHER PUBLICATIONS

Seeman, H. "The Thermal and Electrical Conductivity of Fused Quartz as a Function of Temperature" Phys. Rev. (1928), 31, pp. 119-129.*
Whitmarsh, C. L., "Review of Zircaloy-2 and Zircaloy-4 Properties Relevant to N.S. Savannah Reactor Design" (1962) ORNL-3281.*
Soo-Yong Park et al., "Comparative Analysis of Station Blackout Accident Progression in Typical PWR, BWR, and PHWR", Nuclear Engineering and Technology, vol. 44 No. 3, Apr. 2012.
Ramzi Jammal, "PHWR Group of Countries: Implementation of Lessons Learned from Fukushima Accident in Candu Technology", presentation, Convention on Nuclear Safety, Vienna 2012.
S.K. Yang, "Scaling Methodology for a Passive Moderator Cooling System", Thermal Hydraulics of Advanced Reactors, pp. 917-918.
H.F. Khartabil, "Review and Status of the GEN-IV CANDU-SCWR Passive Moderator Core Cooling System", ICONE16, May 11-15, 2008, Orlando, Florida, USA, ICONE 16-48741.
S.K. Yang, "Instabilities in a Passive Moderator Cooling System of SCWR-CANDU", 5th Int. Sym. SCWR (ISSCWR-5), Vancouver, BC, Canada, Mar. 13-16, 2011, P099.
Sun-Kyu Yang, "Code Simulation of a Preliminary Passive Moderator Cooling System for Canadian SCWR Conceptual Design", 24th Nuclear Simulation Symposium, Oct. 14-16, 2012.
CANDU 6 Program Team, Reactor Development Business Unit, "CANDU 6: Technical Summary", Jun. 2005.
B.B. Baturov et al., "Nuclear Superheating of Steam, Results and Prospects at the Present Stage", Atomnaya Energiya, vol. 44, No. 2, pp. 126-131, Feb. 1978.
W.T. Diamond, "Development of Out-of-core Concepts for a Supercritical-water, Pressure-tube Reactor", CCSC-2010, Apr. 25-28, 2010, Toronto, ON.
M. Yetisir et al., "Conceptual Mechanical Design for a Pressure-tube Type Supercritical Water-cooled Reactor", ISSCWR-5, Mar. 13-16, 2011, Vancouver, BC.
Chow et al., "Conceptual Fuel Channel Designs for CANDU-SCWR", Nuclear Engineering and Technology, vol. 40 No. 2, SCWR special issue, pp. 139-146.
J. Pencer et al., "Impact of Materials on CANDU-SCWR Lattice Physics", ISSCWR-5, Mar. 13-16, 2011, Vancouver, BC, P002.
Stephen J. Bushby et al., "Conceptual Designs for Advanced, High-temperature CANDU Reactors", SCR-2000, Nov. 6-8, 2000, Tokyo.
G.R. Dimmick et al., "An Advanced CANDU Reactor with Supercritical Water Coolant: Conceptual Design Features", paper AECL, Chalk River, Canada K0J 1J0.
Stephen J. Bushby et al., "Conceptual Designs for Advanced, High-temperature CANDU Reactors", ICLONE 8, Apr. 2-6, 2000, Baltimore, MD.
Hinoki, T., L.L. Snead and E. Lara-Curzio, "Effect of Fiber Properties on Mechanical Properties of Crystalline Silicon Carbide Composites".
Snead, L.L., T. Hinoki and Y. Katoh, "Strength of Neutron Irradiated Silicon Carbide and Silicon Carbide Composite".
Katoh, Yutai and Lance L. Snead, "Mechanical Properties of Cubic Silicon Carbide after Neutron Irradiation at Elevated Temperatures", published in Journal of ASTM International.
Pells, George Philip, "Radiation Damage Effects in Alumina", AEA Reactor Services, Materials Performance Department, Harwell Laboratory, UK., Published in Journal of the American Ceramic Society, vol. 77, No. 2.
Wilks, R.S., et al., "The Irradiation-Induced Macroscopic Growth of alpha-Al2O3 Single Crystals", UKAEA Research Group, Ceramics Division, Atomic Energy research Establishment, Harwell, UK, published in Journal of Nuclear Materials 24, (1987) 80-86.
Wachtman, J.R.Jr. et al., "Plastic Deformation of Ceramic-Oxide Single Crystals", National Bureau of Standards, Washington, D.C., Journal of the American Ceramic Society, vol. 37, No. 7 Jul. 1, 1954.
Gooch, D.J. et al., "The Creep of Sapphire Filament with Orientations Close to the c-axis", Department of Metallurgy, University of Oxford, UK, published in Journal of Materials and Science (1973) 1238-1246.
Firestone, R.F. et al., "Creep Deformation of 0 Sapphire", Department of Metallurgy and Materials Science, Case Western Reserve University, Cleveland, Ohio 44106, published in Journal of the American Ceramic Society, vol. 59, No. 1-2.
Harris, Daniel, et al., "Factors that Influence Mechanical Failure of Sapphire at High Temperature", Proceedings SPIE, 3060 (1997).
Kotchick, D.M. et al., "Deformation Behavior of Sapphire Via the Prismatic Slip System", Department of Materials Science and Engineering, The Pennsylvania State University, University Park Pennsylvania, published in Journal of the American Ceramic Society, vol. 63, No. 7-8.
"Properties and Benefits of Sapphire: A Quick Reference Guide", Saint-Gobain Crystals.
"Saphikon EFG Sapphire", Saint-Gobain Crystals.
"EFG Sapphire Tubes", Saint-Gobain Crystals.
Nagae, Masahiro et al., "Corrosion Behavior of Structural Ceramics in Supercritical Water", published in Advanced Science and Technology, vol. 45 (2006) pp. 173-177.
Regan, Thomas M. et al., "Neutron Irradiation of Sapphire for Compressive Strengthening II. Physical Properties Changes", published in Journal of Nuclear Materials 300 (2002) 47-56.
Goto, Takayasu et al., "Elastic Constants of Corundum up to 1825 C", published in Journal of Geophysical Research, vol. 94, No. B6, pp. 7588-7602, Jun. 10, 1989.
Qiu et al., "Phase Relations in the Aluminum Carbide—Aluminum Nitride—Aluminum Oxide System", published in the Journal of the American Ceramic Society, vol. 80, No. 8 2013-2020 (1997).
McAuley, James W., "Structure and Properties of Aluminum Nitride and AION Ceramics", published by Army Research Laboratory, document ARL-TR-2740, May 2002.

* cited by examiner

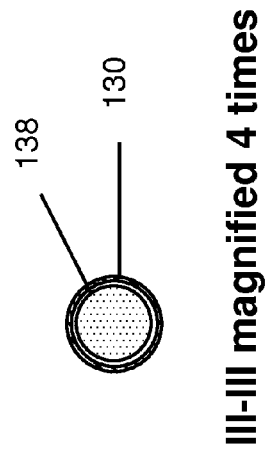
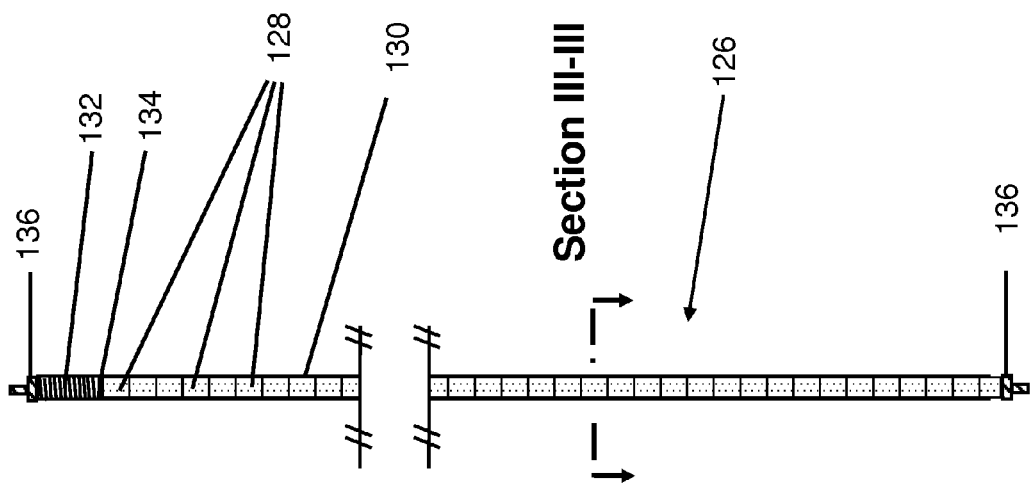

NUCLEAR REACTOR CORES COMPRISING A PLURALITY OF FUEL ELEMENTS, AND FUEL ELEMENTS FOR USE THEREIN

CROSS-REFERENCE TO RELATED APPLICATIONS

This application is related to application Ser. No. 13/830,151 filed concurrently herewith, the entire contents of which are incorporated herein by reference.

TECHNICAL FIELD

This invention relates to nuclear reactor cores comprising a plurality of fuel elements and to fuel elements for use therein, and is applicable to nuclear reactors of the kind having pressure tubes and/or pressure vessels.

BACKGROUND ART

Conventionally, nuclear reactors comprise pressure tubes or pressure vessels, though nuclear reactors that have both pressure tubes and a pressure vessel have been disclosed. The present invention is especially applicable to those having pressure tubes.

At present, nuclear power plant safety is of particular concern in the aftermath of the Fukishama accident in Japan in 2011 and others in which the fuel becomes exposed after the reactor has shut down. Some proposals for improving safety have focused upon prolonging the time to catastrophic failure in a severe accident in which decay heat may cause either or both of fuel cladding failure and hydrogen production. One option is to provide passive decay heat removal following a severe accident but this requires the fuel cladding to be capable of retaining the fuel fission products while the decay heat is transferred from the fuel, predominantly by thermal radiation.

Although improving safety is of paramount importance, it is desirable to do so without reducing efficiency. In fact, there is an ongoing desire to improve the efficiency of nuclear reactor power plants without prejudice to their safety. Improved efficiency can be obtained by increasing operating temperatures. To this end, it has been proposed to build nuclear power reactors employing supercritical water which requires much higher operating pressures than the current art PWR, BWR and PHWR. A fuel must be capable of operating at the temperature and pressure of supercritical water, and withstanding the corrosive environment of irradiated supercritical water and radiation damage. The fuel sheath or cladding must also have acceptably low neutron absorption to function economically while desirably providing for passive decay heat removal following a severe accident in which the fuel becomes exposed after the reactor has shut down.

In this industry, a variety of terms are used for the pressure barrier between the fuel and the reactor coolant. For convenience, in the context of this specification, the term "cladding" will be used for such pressure barrier, whether in a pressure-tube or pressure-vessel type of reactor.

Also, the term "fuel elements" will be used to embrace both the fuel elements of a pressure-tube type of reactor and the fuel rods of a pressure-vessel type of reactor.

The term "fuel assembly" refers to a plurality of fuel elements which are held together in parallel. In the case of a PHWR, this fuel assembly usually is called a "fuel bundle".

Moreover, the term "inert" material will be used to mean that the material does not generate significant hydrogen in the presence of steam or corrode significantly in the presence of irradiated reactor coolant water.

It is known to use supercritical water systems in fossil fuel power stations. However, the technologies, particularly materials, used in supercritical fossil fuel stations cannot necessarily be used in supercritical nuclear reactor stations where low neutron absorption and corrosion resistance at supercritical temperatures and radiation levels are particularly important. This is especially so for the fuels and the fuel assemblies containing them.

It is known, for example, to use stainless steel to clad fuel for a higher temperature operation. It is unlikely that, in severe accident conditions, this fuel cladding would have been capable of retaining fission products while passively transferring decay heat in a PHWR, PWR or BWR.

Other steels, nickel and titanium-based alloys that have been studied for supercritical water reactor use also have relatively high neutron absorption and entail the use of enriched uranium. They would not be entirely suitable for use in applying similar reactor physics when refitting an existing reactor, for example a PHWR.

Current pressure tube type heavy water reactors use a natural enrichment uranium dioxide fuel in a fuel bundle located inside a zirconium alloy pressure tube. The fuel bundle typically comprises 28, 37 or 43 fuel elements. Heavy water coolant inside the pressure tube surrounds the fuel bundles.

The fuel elements are held in a bundle configuration by welding to end plates. Zircalloy bearing pads are located on the outer ring of elements. Spacers are located on the faces of the elements that are adjacent to neighbouring elements i.e., that are juxtaposed when the fuel elements are assembled into a bundle.

Typically, each fuel element comprises a plurality of cylindrical uranium dioxide fuel pellets inside a tubular zircalloy fuel cladding capped at the ends with zircalloy end caps welded to the cladding. Some fuel elements may have a layer of a graphite-based mixture between the fuel elements and fuel cladding.

The fuel operates by producing heat and neutrons from the fission of uranium in the fuel pellets. The rate of heat release is controlled by reactivity mechanisms that control the population of neutrons in the reactor core at any given time. The heat produced in the fuel element is conducted outward to the outer surface of the fuel element where it crosses a small gap or contact area to the inside surface of the fuel cladding. The heat is conducted through the wall of the fuel cladding and convected away into the coolant, which conveys it away as "useful" heat. At least some of the remaining "waste" heat not conveyed away by the coolant passes through the pressure tubs and/or surrounding calandria tube, as the case may be.

When the reactor is shut down, a lower rate of fuel heating continues to be present from the decay of fission products. This heat must be removed to prevent the fuel from heating up to a high temperature at which the fuel cladding will fail and, ultimately, the fuel may melt. To remove this heat, the coolant is kept flowing at all times, which typically requires the continued availability of electric power and a pump that is always operational. If the coolant flow ceases or reduces unacceptably, (known as loss-of-flow accident (LOFA)) or the coolant inventory is lost (known as loss-of-coolant accident (LOCA)), the fuel will heat up and eventually release hazardous fission products. More particularly, in the event of a cladding failure, hazardous gaseous radioactive fission products are promptly released to the coolant. When zirconium, in particular, gets hot in the presence of steam, it forms hydrogen gas which can cause explosions.

While known fuels may function satisfactorily at the current sub-critical pressures and temperatures, their cladding lacks the strength and corrosion resistance to operate satisfactorily at higher temperatures and pressures and especially at the much higher supercritical pressure and temperatures that allow increased power output and thermal efficiency. In severe accident conditions, the cladding could heat up, oxidize (producing hydrogen) and melt before one can get the decay heat out of the fuel channel.

This problem is exacerbated by insulating the pressure tube to ameliorate heat loss. For example, it is known to insulate the pressure tube by providing a surrounding tube around the pressure tube, known by those skilled this art as a "calandria tube", and filling an annular cavity between these tubes with an insulating gas.

It has been proposed, in a paper by Yetizir, M., W. Diamond et al., "Conceptual Mechanical Design for a Pressure-Tube Type Supercritical Water Cooled Reactor", The 5th International Symposium on SCWR, Vancouver, Canada, Mar. 13-16, 2011), and a document referenced therein, to use a solid insulator within the pressure tube. Yetizir et al. use a zirconium alloy, specifically identified by Yetizir et al. as "Excel", with low neutron cross-section for the pressure tube and line the pressure tube with a porous ceramic insulator itself lined with stainless steel. With this arrangement, the exterior surface of the pressure tube is in contact with the coolant moderator and its interior surface is insulated from the fuel and coolant by the stainless steel lined ceramic insulator. The stainless steel lined ceramic insulator is yttrium-stabilized zirconia (YSZ) which has low neutron absorption properties and good, if not excellent, thermal resistance. As a result, the pressure tube tends to remain at the temperature of the coolant and is less likely to rupture. Nevertheless, neither of these insulated-pressure tube arrangements is entirely satisfactory, since decay heat will cause the fuel to heat-up to very high temperatures because of the thermal insulating effect of the stainless steel lined insulator or the insulating gas in the annular cavity. Under severe accident conditions, the temperature will become high enough to cause the conventional fuel cladding to oxidize and eventually melt, leading to hydrogen production and release of fission products. Similar considerations apply to fuel cladding in pressure vessel reactors under severe accident conditions.

SUMMARY OF INVENTION

The present inventor sought to at least mitigate limitations of these known fuel elements, and nuclear reactors cores employing them, or at least provide an alternative.

According to a first aspect of the invention, there is provided a nuclear reactor core of the pressure tube kind in which a plurality of pressure tubes extend through a tank containing, in normal use, heavy water moderator, each of said plurality of pressure tubes containing:

a plurality of fuel elements held together in spaced relationship so as to permit the flow of coolant through spaces between adjacent fuel elements during normal operation, each of said fuel elements comprising a plurality of fuel pellets in a cladding;

each of said plurality of pressure tubes having a protective insulator sleeve on or adjacent an inner surface of the pressure tube, the cladding comprising a material that has a melting temperature of at least 1900° C. and does not form significant amounts of hydrogen if exposed to high temperature steam; and the insulator sleeve comprising a material that has a relatively low thermal conductivity over a range of temperatures encountered during normal operation and relatively high thermal radiation transmission at temperatures in excess of said normal operating temperature range, such that, when coolant is absent from said spaces, the insulator sleeve transmits to the pressure tube at least about 10%, but preferably greater than about 40% of the net thermal radiation from the fuel assembly for conduction through the pressure tube to the moderator and the fuel temperature remains within safe limits after the reactor is shut down.

This arrangement takes advantage of the fact that, when coolant is present and at normal operating temperatures, heat transfer from the fuel bundle is primarily by convection but, when coolant is absent and the fuel overheats, heat transfer from the fuel bundle is primarily by thermal radiation. This thermal radiation may have wavelength and intensity in a range consistent with exposure of the nuclear core to temperatures encountered during severe accident conditions.

The transfer of heat from the fuel to the pressure tube involves a combination of spectrally dependent absorption, reflectivity and emissivity of the cladding and insulator sleeve, matched to temperatures and emissivity characteristics of the fuel pellets, cladding and pressure tube.

The "normal operating temperature" will differ from one reactor type to another and will depend upon reactor type and the materials used. For water-cooled reactors, including those cooled by supercritical water, the normal operating temperature of the coolant and outer surface of the fuel itself may range from as low as 25° C. to as much as 1000° C.

A nuclear reactor core of the first aspect may be used with fuel elements that are not clad with the aforesaid material that has "a melting temperature of at least 1900° C. and does not form significant amounts of hydrogen if exposed to high temperature steam".

Hence, according to a second aspect of the present invention, there is provided a nuclear reactor core in which a plurality of pressure tubes extend through a tank containing, in normal use, heavy water moderator, each of said plurality of pressure tubes containing:

a plurality of fuel elements held together in spaced relationship so as to permit the flow of coolant through spaces between adjacent fuel elements during normal operation, each of said plurality of pressure tubes having a protective insulator sleeve on or adjacent an inner surface of the pressure tube, the insulator sleeve comprising a material that has a relatively low thermal conductivity over a range of temperatures encountered during normal operation and relatively high thermal radiation transmission at temperatures in excess of said normal operating temperature range, such that, when coolant is absent from said spaces, the insulator sleeve transmits to the pressure tube at least about 10%, but preferably greater than about 40%, of net thermal radiation from the fuel assembly for conduction through the pressure tube to the moderator and the fuel temperature remains within safe limits after the reactor is shut down.

In embodiments of either of the first and second aspects of the invention, a suitable material for the sleeve of insulator material may provide:

a) transmission of thermal radiation of about 10%-90%, but preferably more than about 40%, of the net heat energy released from the fuel assembly at temperatures in excess of about 1000° C.;

b) low thermal conductivity (e.g., less than about 2 W/mK);

c) low neutron absorption (comparable to or better than existing fuel channel components).

One suitable such insulator sleeve material is fused silica.

The interior of the insulator sleeve must tolerate sliding of the fuel bundle and exposure to the corrosive high temperature irradiated coolant flowing through the fuel bundle, when in use. Accordingly, for better mechanical and chemical performance, for example abrasion resistance and corrosion resistance, an interior surface of the insulating sleeve may have a lining or coating of a mechanically durable inert material with good thermal radiation transmission, such as sapphire.

Thus, a plurality of support tabs may be secured to the outer ring of fuel elements of the bundle to support the fuel bundle in the pressure tube, the tabs also comprising a material that is substantially transparent to thermal radiation and does not form a significant amount of hydrogen if exposed to high temperature steam.

The support tab material need not be the same material as that used for the cladding, but it would be convenient to use the same material for both.

In one specific embodiment of the first aspect of the invention, there is provided a nuclear core comprising a plurality of pressure tubes insulated by an insulator sleeve of fused silica lined/coated with sapphire, each pressure tubes containing a fuel bundle comprising a plurality of parallel fuel elements each comprising fuel pellets in a sapphire cladding.

A coating of sapphire on the interior surface of the insulator sleeve may be applied using one of several known methods, including chemical vapour deposition and plasma deposition.

A sapphire liner may be produced by edge-defined film-fed growth of part-cylindrical segments. Aluminium nitride bonding may be used to join the cylindrical segments together to form a tube. Fine-forming or grinding may be used to finish the liner to obtain a desired smoothness.

In embodiments of either of the first and second aspects, the fuel element may comprise fuel pellets in tubular cladding closed at each end with end caps, in which case, the tubular cladding and end caps may be made from the same said material.

Although the fuel elements are particularly suited to use in a nuclear reactor core of the pressure tube type, they could be used in other types of reactor, such as BWRs and PWRs.

Hence, according to a third aspect of the present invention, there is provided a fuel element for use in a nuclear reactor core in which a plurality of fuel elements are held together in spaced relationship so as to permit the flow of coolant through spaces in the bundle during normal operation, the fuel element comprising a plurality of fuel pellets in a cladding of material that has a melting temperature of at least 1900° C. and does not form significant amounts of hydrogen if exposed to high temperature steam.

In embodiments of either of the first and third aspects of the invention, the cladding material may be substantially transparent to thermal radiation at temperatures above a predetermined temperature (about 1000° C.).

A suitable cladding material may have a thermal conductivity over the normal operating temperature range that is greater than about 5 W/mK and low neutron absorption, at least when compared with previously-known fuel claddings, such as zircalloy 4 or stainless steel.

The cladding material also may have relatively high corrosion resistance in irradiated supercritical water.

An especially suitable cladding material comprises sapphire. Single crystal sapphire may be preferred for some applications. The sapphire may be an edge defined film fed growth formation.

Fuel elements embodying this third aspect may be used in pressure-tube or pressure-vessel reactors.

In embodiments of either of the first and third aspects, the sapphire cladding material may comprise a material formed by means of a high temperature fine forming method. End caps may be joined to respective ends of the cladding tube by an aluminium oxy-nitride bond between respective juxtaposed surfaces of the cladding and end caps. Methods of making (finishing) sapphire cladding are disclosed and claimed in the above mentioned in concurrently-filed patent application Ser. No. 13/830,151.

BRIEF DESCRIPTION OF DRAWINGS

Various objects, features, aspects and advantages of the present invention will become more apparent from the following detailed description of embodiments of the invention, which description is provided by way of example only and to be taken in conjunction with FIGS. 6 to 9, inclusive, of the accompanying drawings.

FIG. 1 to 5, inclusive, illustrate prior art also to be described herein. In the drawings, identical or corresponding elements in the different Figures have the same reference numeral.

FIG. 2 (Prior Art) is a perspective view of a fuel bundle of a so-called pressurized heavy water reactor (PHWR) comprising a bundle of fuel elements;

FIG. 3 (Prior Art) is a cross-sectional view of a fuel channel comprising a bundle of fuel elements of the kind shown in FIG. 2 enclosed within a pressure tube itself enclosed within a surrounding tube and shows a thermal profile on a radial line through the fuel elements, pressure tube and surrounding tube under normal operating conditions;

FIG. 4 (Prior Art) is a cross-sectional view a fuel channel similar to that shown in FIG. 3 but showing a damaged fuel bundle and a thermal profile typical of severe accident conditions; and FIG. 5 (Prior Art) is a cross-sectional view of an alternative fuel channel comprising a bundle of fuel elements surrounded by a stainless-steel liner of a ceramic sleeve insulating a pressure tube, the fuel bundle being shown damaged, and also shown is an associated thermal profile under severe accident conditions.

FIGS. 6 to 10, inclusive, now will be used in describing embodiments of the present invention. Thus;

FIG. 6 is a perspective view of a bundle of fuel elements embodying the present invention;

FIG. 7 is a cross-sectional view of one of the fuel elements of the fuel bundle shown in FIG. 6;

FIG. 7A is a cross-sectional view taken on the line A-A of FIG. 7;

FIG. 8 is a cross-sectional view of a bundle of fuel elements of the kind shown in FIG. 6 enclosed within a pressure tube having an internal insulator sleeve coated or lined with sapphire and shows a thermal profile on a radial line through the fuel elements and internally-insulated pressure tube under severe accident conditions;

FIG. 9 is a cross-sectional view of a fuel element embodying the invention that is suitable for a fuel assembly of a PWR or BWR;

FIG. 9A is a cross-sectional view taken on the line A-A of FIG. 9; and

FIG. 10 is a cross-sectional view of a fuel bundle similar to FIG. 8 but illustrating the thermal profile along the radial line R when the fuel bundle is operating with supercritical water coolant under full power conditions.

DESCRIPTION OF SPECIFIC EMBODIMENTS

Figure 1B:
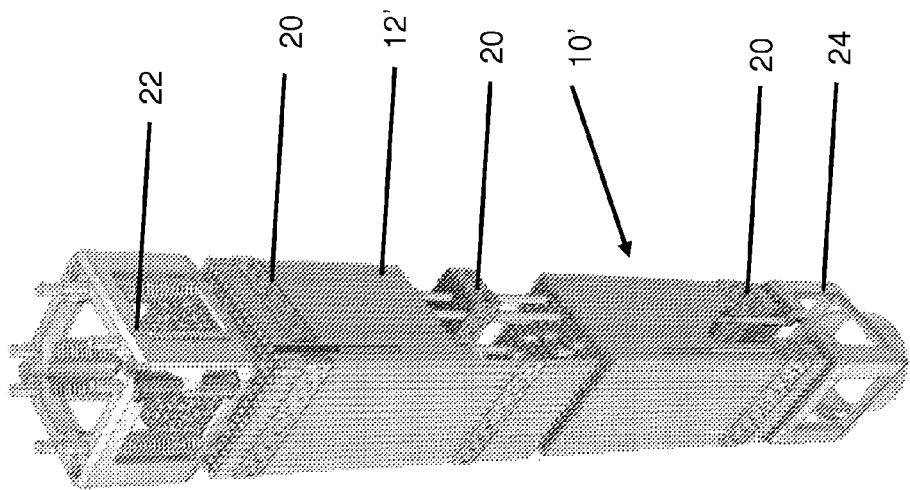
FIG. 1B (Prior Art) is a perspective view of a fuel assembly of a so-called pressurized light water reactor (PWR)
Figure 1A:
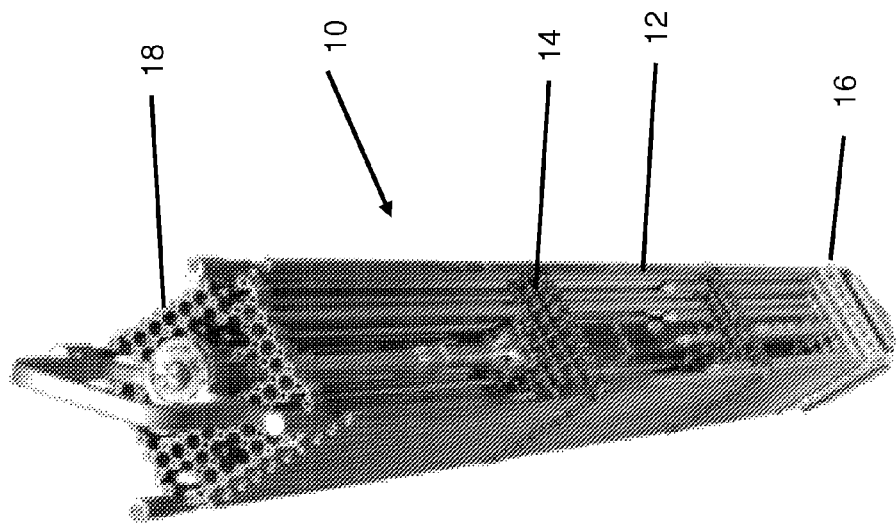
FIG. 1A (Prior Art) is a perspective view of a fuel assembly of a so-called boiling light water reactor (BWR)

FIG. 1A is a perspective illustration of a fuel assembly of a boiling light water reactor (BWR). The fuel assembly 10 comprises a plurality of fuel elements 12 assembled together in a generally rectangular array which in use would normally be vertical and held apart by a plurality of spacers 14 and held together by a bottom-tie plate 16 and a top-tie plate 18.

FIG. 1B is a perspective illustration of a fuel assembly of a pressurized light water reactor (PWR) and comprises a fuel element assembly 10' comprising fuel elements 12', differing somewhat from fuel elements 12 of FIG. 1A, held together by central grids 20 in a vertical rectangular array captured at the top by a top nozzle 22 and at the bottom by a bottom nozzle 24. The top nozzle 22 and bottom nozzle 24 are used to pass pressurized light water past fuel elements 12'. The light water then passes out to a separate cooling system and is recirculated back into the fuel assembly.

Each of the fuel elements 12 and 12' shown in FIGS. 1A and 1B, i.e. the kind used in a boiling light water reactor (BWR) or a pressurized light water reactor (PWR), will typically be about several meters long, for example 4 meters, which is why it needs to be supported by intermediate spacers 14 or grids 20.

Each of the fuel elements 12 and 12' of the fuel assemblies shown in FIGS. 1A and 1B comprises a cladding tube housing a plurality of cylindrical fuel pellets concatenated end-to-end. The fuel cladding tube and the two end caps typically are made of a zirconium alloy. The fuel pellets will typically comprise uranium dioxide.

A fuel bundle of a pressurized heavy water reactor (PHWR) will differ from the fuel assemblies of FIGS. 1A and 1B and now will be described with reference to FIGS. 2 and 3. Thus, the fuel bundle 26 comprises a cylindrical bundle of fuel elements 28 held together by an end plate 30 at each end (only one is shown). Each end plate 30 takes the form of an open grid to allow coolant 40 (see FIG. 3) to flow through the bundle of fuel elements 28. Usually, the coolant comprises light or heavy water, which, in normal operation, is pressurized. The outermost fuel elements of the fuel bundle 26 each carry several bearing pads 32 welded to them which serve to support the fuel bundle 26 within a pressure tube 36 (see FIG. 3). Each fuel element 28 may comprise uranium dioxide fuel pellets contained in a zirconium-alloy cladding.

Whereas the fuel elements 12 and 12' of the BWR and PWR shown in FIGS. 1A and 1B, respectively, typically will be several meters long, for example 4 meters, in a PHWR fuel bundle 26, the equivalent fuel elements 28 will be generally shorter, for example, about 0.5 meters long, and usually a somewhat larger diameter.

Figure 3:
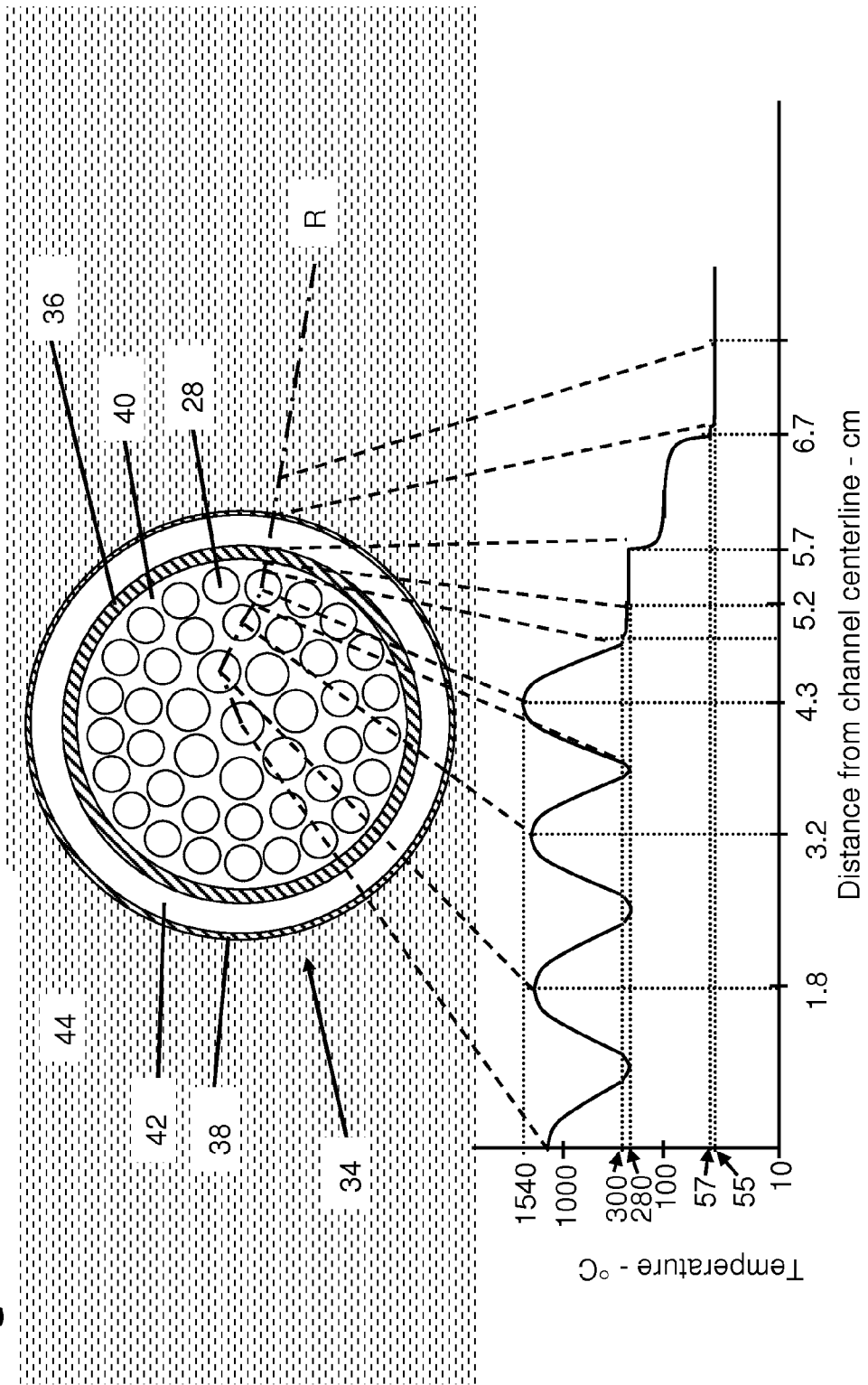

FIG. 3 shows, in cross-section, a fuel channel 34 comprising the fuel bundle 26 housed in a pressure tube 36 which is itself surrounded by a surrounding tube 38. The pressure tube 36 may comprise zirconium alloy and retains within it the coolant 40. The interior diameter of the surrounding tube 38 is larger than the exterior diameter of the pressure tube 36 so as to leave an annular cylindrical gas space 42 between them. The annular cylindrical gas space 42 contains an insulating gas, for example carbon dioxide, typically at about atmospheric pressure. The surrounding tube 38, which typically is made of zirconium alloy, is surrounded by heavy water moderator 44. Typically, the heavy water moderator 44 will have a significant volume, e.g. housed in a relatively large tank (not shown) and, unlike the coolant 40 inside the pressure tube 36, will not be under any significant pressure.

FIG. 3 also shows a thermal profile taken along a line extending outwards non-linearly "dog-leg" from the center of the fuel channel 34 and designated by the letter R. The thermal profile corresponds to when the fuel channel 34 is installed in a reactor operating normally at full power. The thermal profile will now be described but it should be observed that the particular temperatures specified are for illustration purposes only and not necessarily indicative of a particular configuration of PHWR.

The thermal profile has on the x axis the distance from the channel center line in centimeters and on the vertical axis the temperature in degrees Celsius. The profile begins at a point in the central fuel element 28 of the fuel bundle 26 and has high points corresponding to the centers of the fuel pellets and low points corresponding to locations in the coolant 40 intermediate to the fuel elements/pellets. The peak fuel temperature as shown is 1540° C. and the coolant temperature varies between 280° C. in the bulk of the coolant 40 and 300° C. next to the fuel element 28. The temperature remains near 280° C. in the coolant 40 through to the exterior of the pressure tube 36, shown as 5.2 centimeters from the center line. The temperature begins to drop more rapidly and non-linearly across the gas filled annular space 42. At the interior surface of the surrounding tube 38, shown as 6.7 centimeters from the center, the temperature drops to about 57° C. The temperature at the outside of the surrounding tube 38 remains near 57° C., with a drop to 55° C. in the bulk of the moderator heavy water 44 surrounding the surrounding tube 38.

Figure 4:
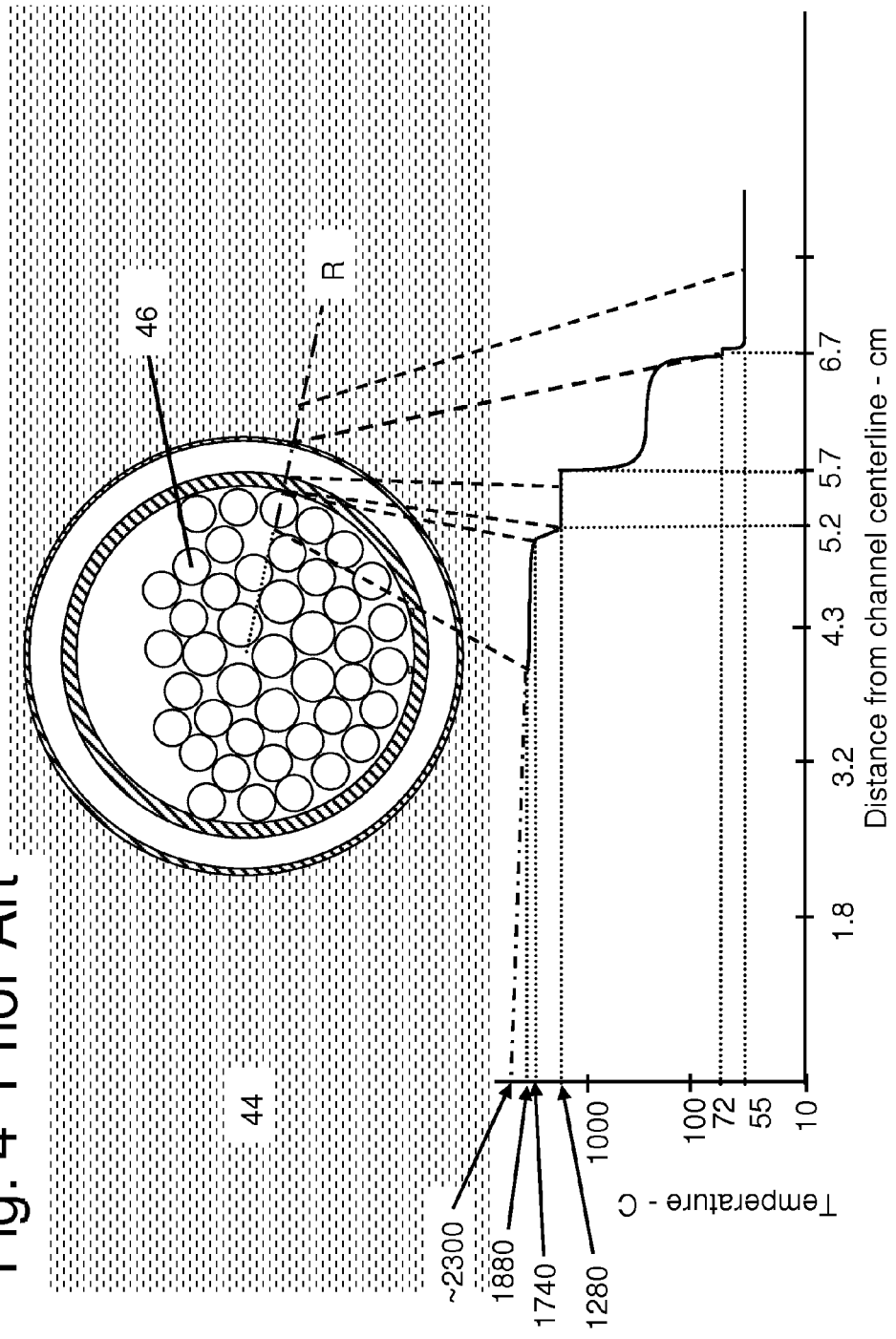

Referring now to FIG. 4, which shows the same fuel channel 34 as FIG. 3 but with a thermal profile under severe accident conditions, the fuel pellets 46 are shown agglomerating towards the lower part of the pressure tube 36 due to partial or complete collapse of the fuel bundle 26 as a result of oxidation and melting of zirconium alloy, i.e. which was forming the cladding and end plates holding the pellets of the fuel bundle 26 together.

The thermal profile shown in FIG. 4, once again taken along a line from the centre of the fuel channel outwardly as identified by line R, has a completely different distribution to that shown in FIG. 3. As can be seen, the temperature across the agglomeration of fuel pellets 46 ranges from about 1700° C. at the outside to about 2300° C. at the center, which is well above the normal operating temperatures shown on FIG. 3.

The fuel cladding temperatures are in excess of 1740° C. as compared with between 300° C. and 350° C. in normal operation. These temperatures far exceed what is safe for zirconium alloy, i.e. the material from which the cladding is made. More particularly, at temperatures in excess of about 500° C., the zirconium alloy will begin to deteriorate mechanically. More importantly, at temperatures in excess of about 1200° C., it will begin to oxidize in the presence of steam, generating hydrogen and affecting or compromising the structural integrity of the cladding. The cladding will melt, completely losing its structural capability above 1850° C. The generation of the hydrogen can itself lead to serious problems of explosion and catastrophic failure in the presence of air. The hydrogen generated in the fuel channel may mix with air if it is released through the pressure relief system or if there is a pressure boundary failure that introduces air into the fuel channel or connected systems. This hydrogen is a significant explosion hazard if it mixes with the air in containment and achieves flammable or explosive concentrations. A similar hydrogen hazard exists with the PWR and BWR reactors.

For further information about the generation of hydrogen during a severe accident involving a BWR reactor, the reader is directed to data is that published by Sandia National Laboratories (Report Number SAND2012-6173) in their assessment of the Fukushima, Japan accident. For further information about generation of hydrogen during a severe accident involving either a PHWR reactor or a PWR reactor, the reader is directed to data that assessed by S-Y Park and K-I Ahn (Published in Nuclear Engineering and Technology) in their comparative assessment of station black-out accidents for different reactor types. Also, A. Budu and D. Dupleac have assessed additional PHWR hydrogen generation (UPB Science Bulletin) from the oxidation of pressure tubes during severe accidents.

It has been proposed to alter the thermal profile of a fuel channel by providing insulating material between the coolant and the pressure tube. More particularly, as disclosed by Yetizir et al. (supra), there is disclosed a fuel channel comprising a fuel bundle surrounded by, in order, a stainless steel liner tube 48, a porous ceramic insulator 50 and a pressure tube 36'. The outside of the pressure tube 36' is in contact with the relatively cold moderator fluid 44. The significance of the porous ceramic insulator is that the temperature of the pressure tube 36' is likely to remain close to the temperature of the moderator regardless of the temperature of coolant or fuel.

Figure 5:
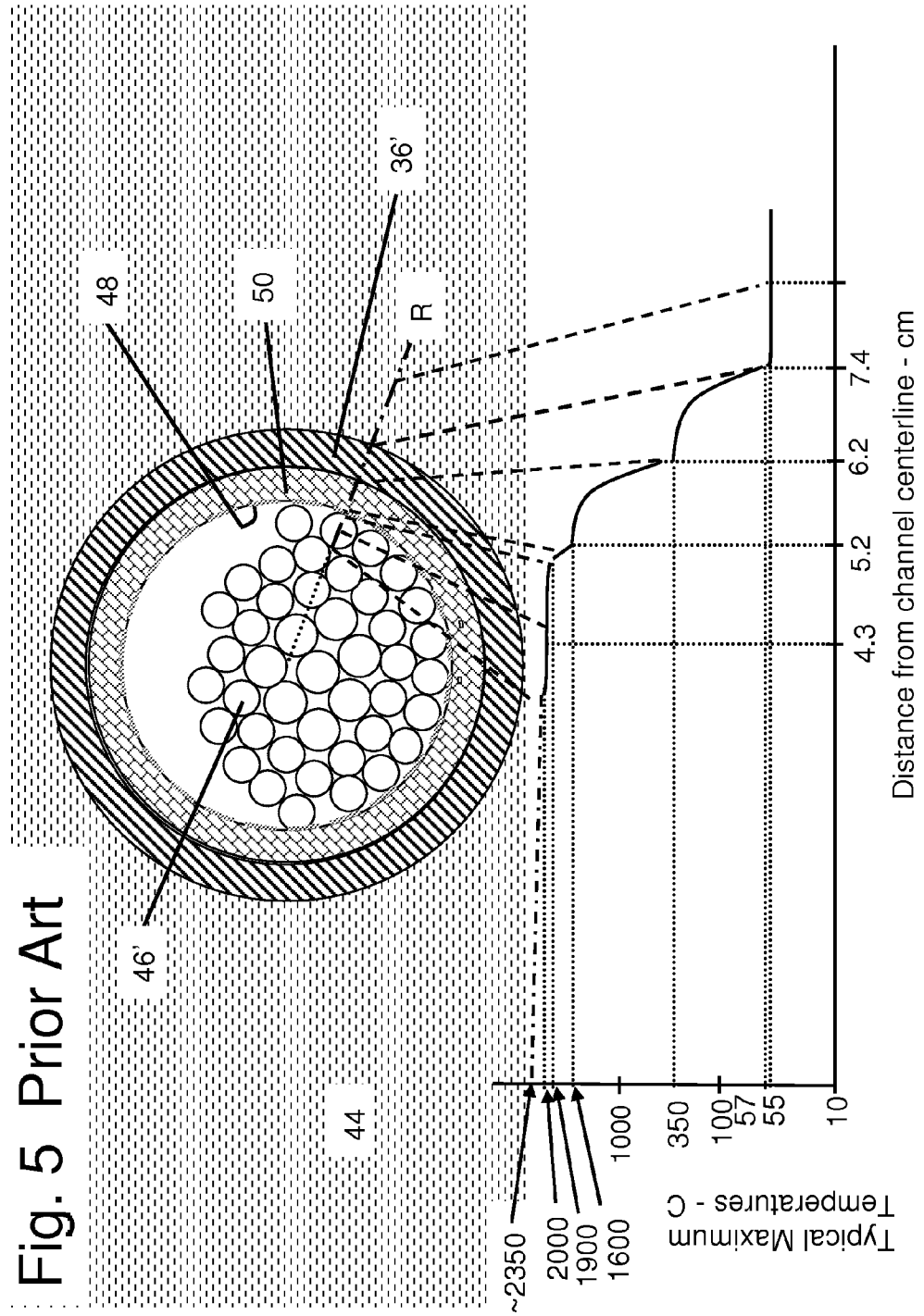

Referring now to FIG. 5, which shows the Yetizir fuel channel with a thermal profile under severe accident conditions, as with the fuel channel shown in FIG. 4, the fuel pellets 46' are shown agglomerating in the lower part of the pressure tube 36' due to collapse of the fuel bundle as a result of oxidation and melting of its stainless steel endplates and cladding. As shown in the thermal profile in FIG. 5, the fuel temperatures from the center of the fuel channel outwards along the line R, are in excess of 1900° C.; hence even higher than the fuel temperatures in FIG. 4. The temperature drops slightly from about 1900° C. on the outer surface of the fuel to about 1600° C. at the location of the liner tube 48. This exceeds the melting temperature of the stainless steel liner tube 48, which will melt and relocate to the bottom of the fuel channel. Moving outwards, the temperature drops by over 1000° C. to just under 350° C. at the inner surface of the pressure tube 36'. The temperature then drops by nearly 300° C. across the pressure tube to 57° C. on the outside surface of the pressure tube. Finally, the temperature drops another 2° C. between the outer surface of the pressure tube 36' and the bulk of the heavy water moderator 44.

Embodiments of the present invention will now be described with reference to FIG. 6 to FIG. 10, inclusive, with reference numbers, in general, 100 greater than those used for corresponding items in FIGS. 1 to 5.

Figure 2:
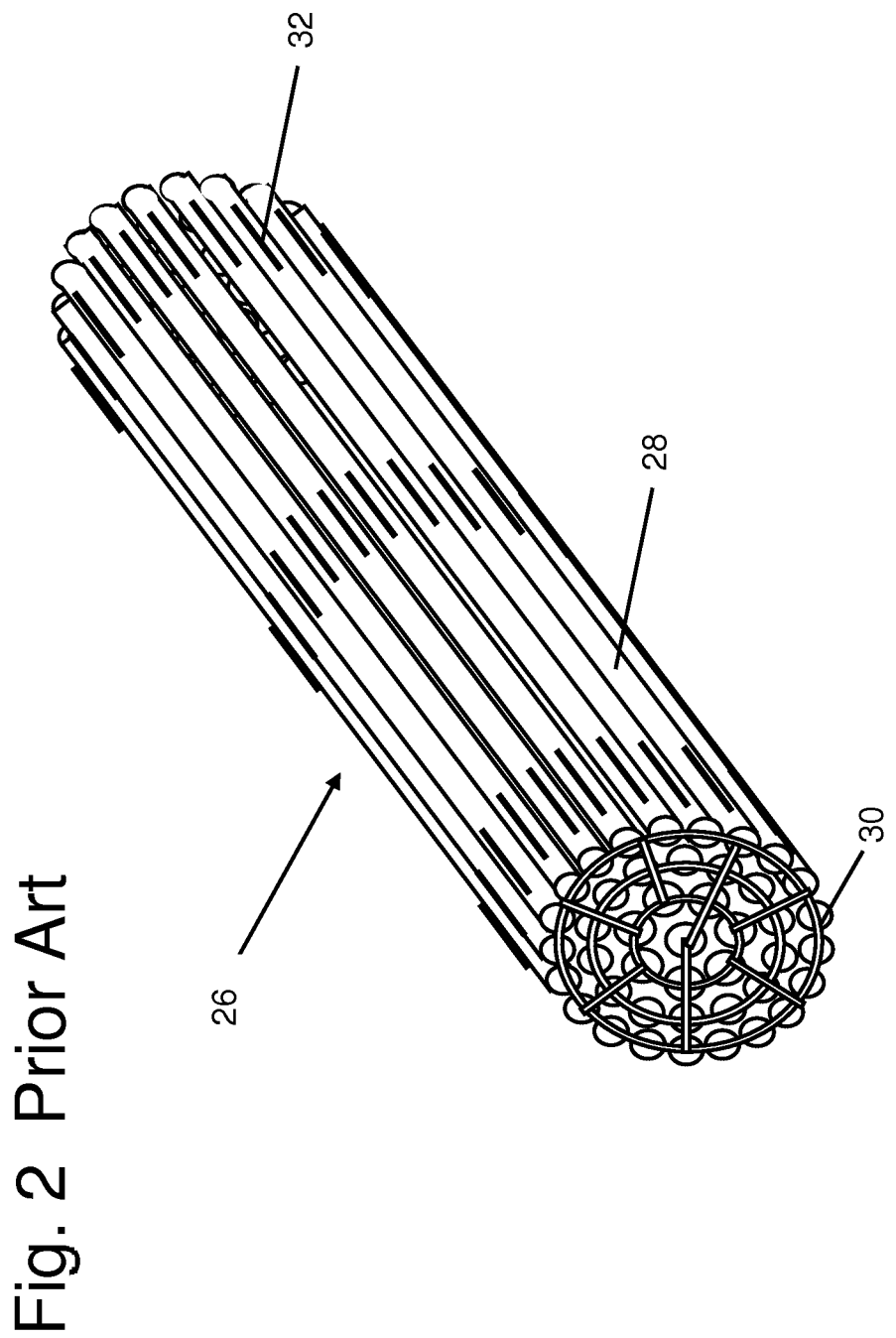
Figure 6:
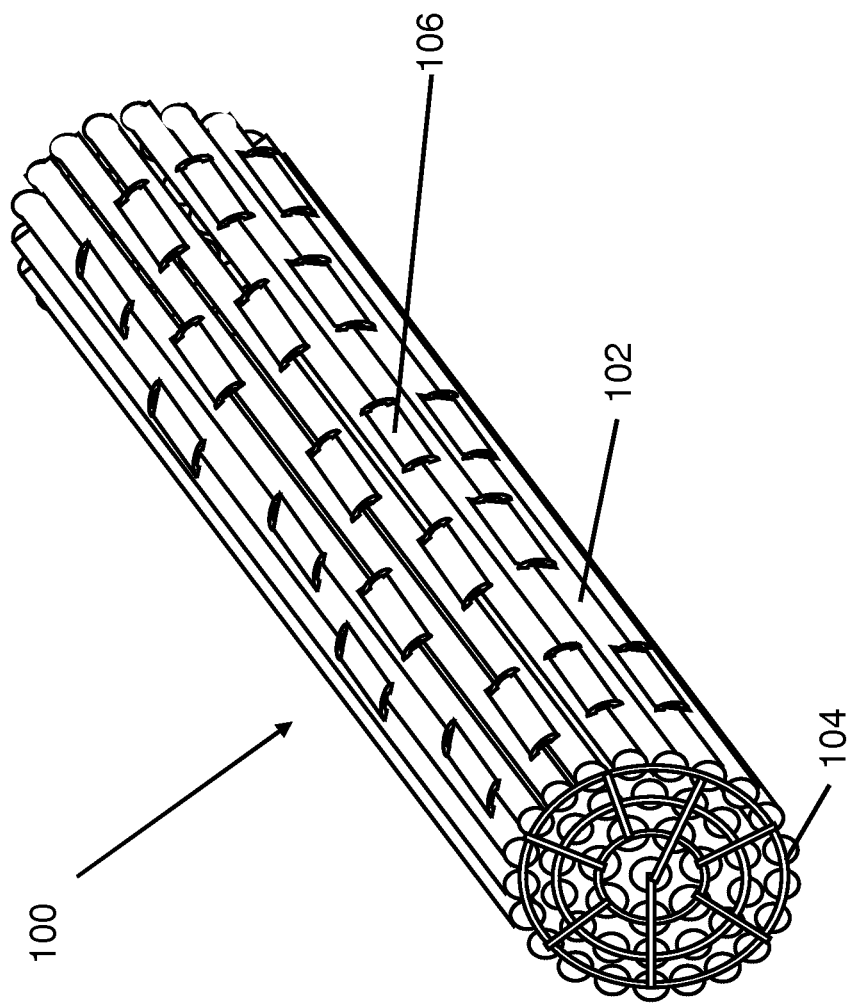

Referring to FIG. 6, a fuel bundle 100 is similar to that shown in FIG. 2 in that it comprises a bundle of fuel elements 102 connected together with/by a pair of end plates 104. There are significant differences, however, in the construction and materials. One difference is that there are no stainless steel bearing pads (32 in FIG. 2); instead a plurality of part-cylindrical tabs 106 are distributed around the outwardly-facing surfaces of the outermost ones of the fuel elements 102. Each of these tabs 106 has a larger contact area than a typical bearing pad 32 so that, in comparison, the contact pressure would be reduced. The significance of this reduction in contact pressure will be discussed further with reference to FIG. 8. It should be noted that the tabs 106 are made of an inert material that is substantially transparent to infrared radiation, for example single crystal sapphire. Hence, the tabs 106 can be envisioned as "windows" that are transparent to thermal radiation.

Figure 7:
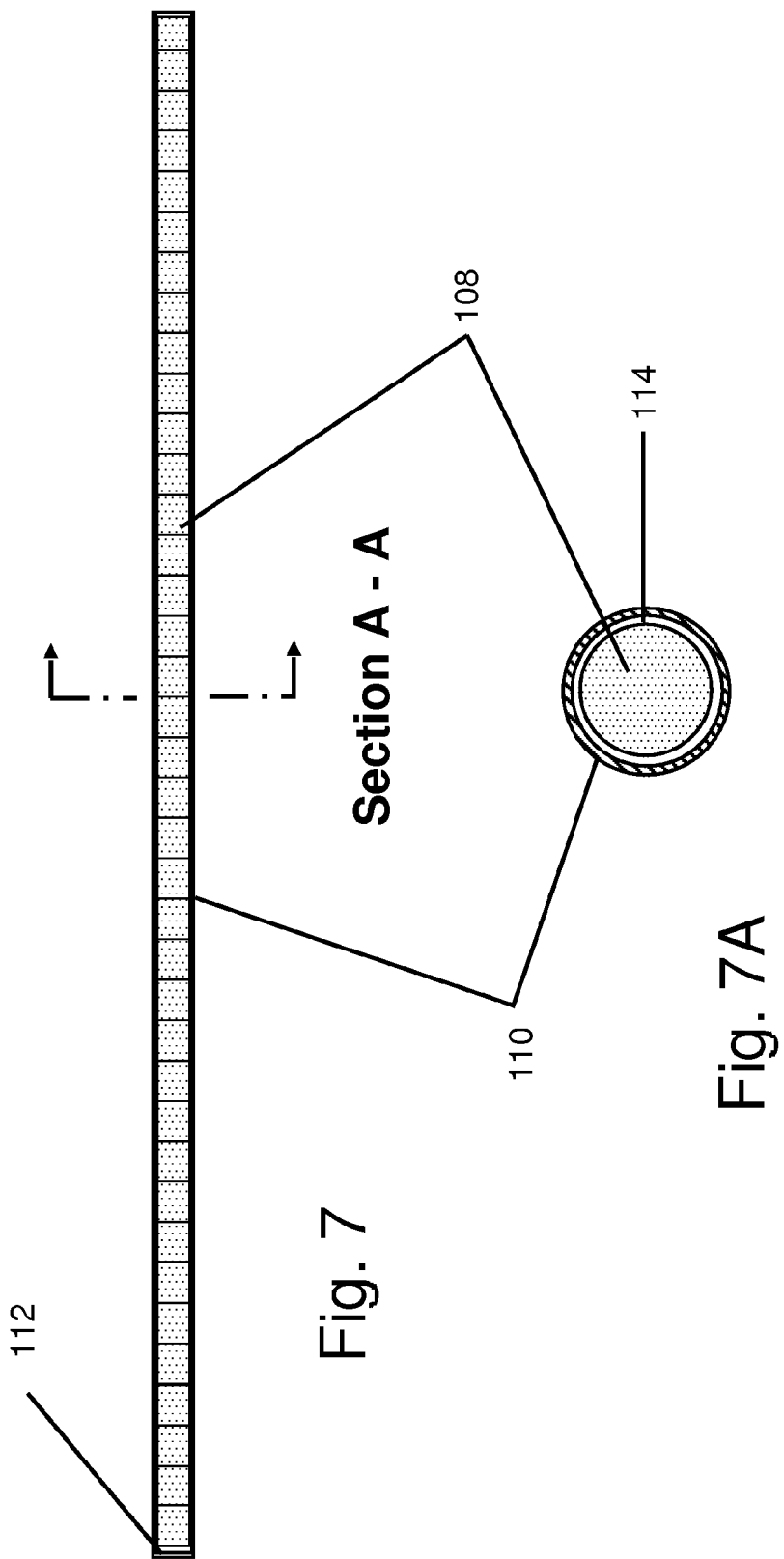

Referring also to FIGS. 7 and 7A, each of the fuel elements 102 shown in FIG. 6 comprises a plurality of fuel pellets 108 concatenated in cladding 110 in the form of a tube closed at each end by an end cap 112. The cladding 110 and end caps 112 also are made of an inert material that may be substantially transparent to infrared radiation. It will be appreciated that it would be convenient to use the same material for the tabs 106, cladding 110 and end caps 112, especially single crystal sapphire.

Single crystal sapphire may be preferred because of one or several of a range of properties. Examples include good thermal radiation transmission characteristics, inertness to corrosion in irradiated high temperature (and even supercritical) water, high melting temperature (greater than 2000° C.), low neutron absorption (comparable to existing cladding materials), desirable mechanical characteristics under neutron radiation under a wide range of temperatures, thermal and mechanical strain characteristics compatible with those of uranium dioxide (fuel). Moreover, single crystal sapphire does not deteriorate under prolonged irradiation, unlike polycrystalline sapphire which deteriorates mechanically due to the anisotropic irradiation growth of the crystals.

As can be seen from FIG. 7A, which shows, magnified, a cross-section through one of the fuel elements 102 of FIG. 7, when the fuel element 102 first is manufactured, there is a small difference in diameter between the interior of the cladding 110 and the exterior of the fuel pellet 108, leaving an annular cylindrical space 114 around the concatenated pellets 108. This space is filled with pressurized helium.

Figure 8:
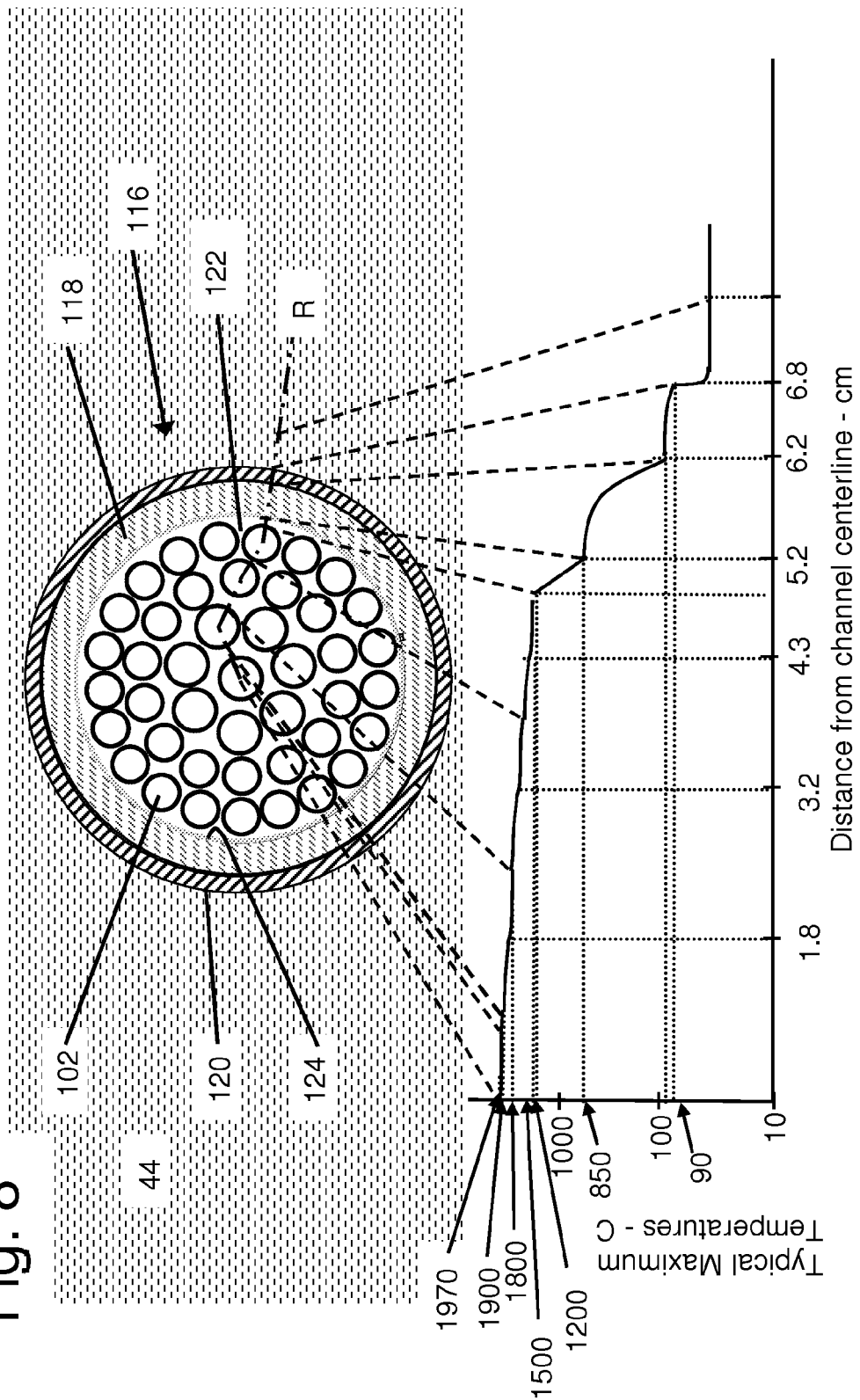

FIG. 8 shows, in cross-section, a fuel channel 116 comprising the fuel bundle 100 of FIG. 6 housed in an insulating sleeve 118 inside a pressure tube 120. The insulating sleeve 118 insulates the coolant 122 from the pressure tube 120 whose temperature is close to that of the moderator 44. This is in contrast to the use of an annular gap between the pressure tube and surrounding tube as depicted in FIG. 3.

In the fuel channel 116 of FIG. 8 the insulator sleeve 118 is made from a low thermal conductivity material that has favourable transmission characteristics for thermal radiation and has low neutron absorption cross-section. One suitable such material is fused silica. It is envisaged, however, that the insulator sleeve material could be a low density matrix of sapphire having low matrix thermal conductivity when infused with water and high thermal radiation transmission.

The interior of the insulating sleeve 118 must tolerate sliding of the fuel bundle 100 and exposure to the corrosive high temperature irradiated coolant 122 flowing through the fuel bundle 100, when in use. Accordingly, for better mechanical and chemical performance, for example abrasion resistance and corrosion resistance, the insulating sleeve 118 has a lining or coating 124 of a mechanically durable inert material with good thermal radiation transmission, such as sapphire.

While the abrasion-resistant liner or coating 124 on the insulator sleeve 118 and the low contact pressure tabs 106 on the fuel bundle 100 may be used independently of each other, using both in combination may provide a highly reliable and wear resistant configuration for the fuel channel.

The material used to make the pressure tube 120 is a material of very high strength and low neutron absorption such as a silicon carbide fiber-reinforced silicon carbide matrix. The material may either have high emissivity, desirably greater than 0.8, as does silicon carbide, or the internal surface of the pressure tube may be coated with a high emissivity coating; such a coating may comprise, for example, elemental carbon embedded in glass and coated with sapphire.

Referring again to FIG. 8, configuration and composition of the elements and materials results in an efficient thermal radiation path from the fuel pellets 108 through the cladding 110, the lining 124 and insulator 118 to the interior surface of the pressure tube 120, the exterior of which is, of course, cooled by the heavy water moderator. This leads to a reduction in the peak temperature of the fuel and fuel cladding under severe accident conditions.

The combination of getting the heat out of the fuel channel efficiently, with the high temperature capability of sapphire allows the fuel cladding to remain intact throughout a severe accident, thereby preventing the release of the hazardous fission products in the fuel. The inert nature of sapphire in a hot steam environment also avoids the generation of hazardous hydrogen gas which could lead to an explosion.

The benefits of using, specifically, substantially infrared transparent single crystal sapphire cladding and tabs, and coated/lined fused silica insulator will be evident from the FIG. 8 thermal profile along the "dog leg" radial line R beginning at the center line of the fuel channel. Such a thermal profile, that tracks heat generation and loss following reactor shutdown, usually will be produced by complex calculations, typically done by computer.

The thermal profile of FIG. 8 is for an extreme, perhaps impractical, condition where there is an instantaneous and complete loss of coolant at the time of reactor shutdown. More practical scenarios, where some coolant persists shortly after shutdown, such as might be provided by a passive emergency coolant injection accumulator, may result in significantly lower worst maximum cladding temperatures, say about 1700° C. It will be seen that across the fuel elements 102 the temperature is in the range of 1200° C. to 1970° C. i.e. from the inside of the insulator sleeve 118 to the outside of the centre most one of the fuel elements 102; a distance of approximately 5 centimeters in practice.

In this case, the cladding 110 of the fuel elements comprises single crystal sapphire again which can tolerate temperatures approaching 2000° C. Consequently, the cladding 110 is less likely to fail and release hazardous fission products produced within the fuel contained by the fuel cladding 110. The fuel bundle 100 will not be damaged and will not collapse in the manner depicted in FIGS. 4 and 5. It will also be seen from the thermal profile in FIG. 8 that the temperature at the innermost surface of the insulator 118 is around 850° C. but at its exterior surface, i.e. in contact with the pressure tube 120 interior surface it has fallen to just under 100° C. This is less than 45° C. degrees above the temperature of the moderator 44.

It should be noted that, at the more realistic worst case cladding temperature of about 1700° C., sapphire retains most of its structural strength and is unlikely to fail and release hazardous fission products.

It can be appreciated that if the heat deposited in the moderator from the fuel channel can be removed passively then there is a fully passive means of indefinitely removing decay heat from the fuel to the environment. Furthermore this passive means of removing heat will be operative without operator action and even after a LOCA accident.

It is envisaged that, since embodiments of the present invention are capable of passively transferring decay heat to the moderator during severe accident conditions, they could be combined with a passive cooling system proposed by Sun-Kyu Yang (Canadian Nuclear Society, 24$^{th}$ Nuclear Simulation Symposium, Oct. 14-16, 2012) to provide passive cooling of a Pressurized Heavy Water Reactor moderator by using a flash driven natural circulation loop receiving cooling from a passive emergency water system. When such a passive moderator cooling system is combined with passive decay heat removal from the fuel to the moderator, as disclosed hereinbefore, it provides a completely passive means of removing decay heat for what would otherwise be a range of severe accidents. These include total station blackout (SBO) such as what was precipitated in a Boiling Water Reactor (BWR) by the earthquake and Tsunami at Fukushima Japan and Loss-of Coolant accidents (LOCA) leading to uncovering of the reactor core such as what occurred at a Pressurized Water Reactor (PWR) at Three Mile Island in the United States.

It should be appreciated that this combination of passive cooling of the fuel channel with passive cooling of the moderator may provide for continuous, even infinite passive cooling of the reactor even under severe accident conditions.

Although the foregoing embodiments have been described in the context of a pressurized heavy water reactor fuel bundle, it should be appreciated that the benefits of no hydrogen production and higher fuel temperature tolerance will also be attained by using a material that has a melting temperature of at least 1900° C. and does not form significant amounts of hydrogen if exposed to high temperature steam, for example single crystal sapphire, to form the cladding of the fuel rod in either the boiling water reactor BWR fuel assembly or a pressurized light water reactor PWR fuel assembly.

Referring to FIGS. 9 and 9A, the fuel element for a BWR fuel assembly 126 comprises a plurality of fuel pellets 128 concatenated in cladding 130 in the form of a tube. The fuel pellets 128 are held tightly together end to end by a spring 132 applying force to a spacer 134 in contact with the uppermost fuel pellet. The cladding tube 130 is closed at each end by an end cap 136. The cladding 130 and end caps 136 are made of an inert material having a high temperature melting point. It will be appreciated that it would be convenient to use the same material for the cladding 130 and end caps 136, especially single crystal sapphire.

As mentioned hereinbefore, single crystal sapphire may be preferred because of one or several of a range of properties.

As can be seen from FIG. 9A, which shows, magnified, a cross-section through one of the BWR fuel element 126 of FIG. 9, when the fuel element 126 first is manufactured, there is a small difference in diameter between the interior of the cladding 130 and the exterior of the fuel pellet 128, leaving an annular cylindrical space 138 around the concatenated pellets 128. This space is filled with pressurized helium.

It should be appreciated that a PWR fuel element can be manufactured using similar materials to the BWR fuel rod 126 shown in FIGS. 9 and 9A, the principal differences being the use of different fuel pellets and slightly different dimensions of the fuel rod components.

The chemically inert nature of sapphire in a steam and water environment will ensure that even if very high temperatures are reached in a light water reactor no significant hydrogen will be generated from fuel cladding oxidation and the risk of resulting damage and explosion from hydrogen can be avoided by use of this fuel cladding system. It should be noted that the invention is not limited to the specific embodiments or described herein i.e., the boiling (light) water reactors and pressurized light water reactors and pressurized heavy water reactors, but rather could be applied to super critical variations of those reactors and especially the latter three.

Figure 10:
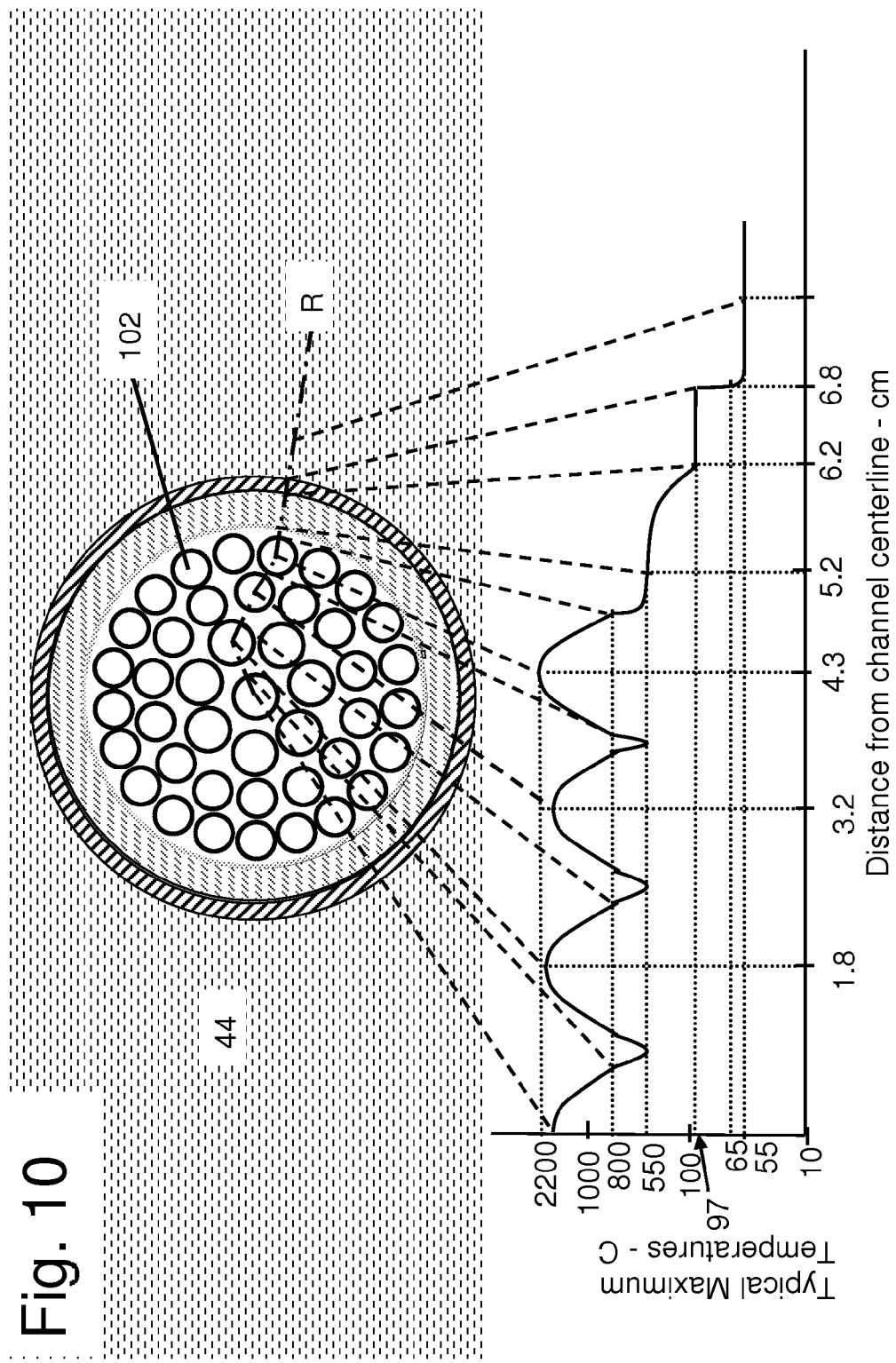

FIG. 10 depicts the thermal profile across a fuel bundle similar to that shown in FIG. 6 or 8 when used under super critical full power operation. It will be seen from FIG. 9's thermal profile that the cladding 110 of the fuel element 102 has a temperature of about 800° C. which is in excess of the temperature of which a zirconium alloy such as zircalloy-4 will function properly. It should also be noted that the temperature at the middle of the fuel element 102 is 2200° C. which is higher than the conventional PHWR fuel temperature in FIG. 3. This higher fuel temperature for the super critical PHWR fuel results from the higher temperature of the supercritical water coolant and the higher power densities that may accompany supercritical water reactor operation. Operation of a reactor at the higher temperatures that are possible with supercritical water results in higher thermal efficiency and greater electrical output.

At this point the construction and configuration of fuel elements/rods embodying the present invention have been described. However, the sapphire material used for the cladding of the fuel elements and the fuel bundle parts is not easy to produce. While grinding of single crystal sapphire to final cladding and component dimensions may be possible, it may not be economical and commercially viable at this time. Fine forming methods and joining processes needed to transform rough formed edge-defined film growth single crystal sapphire parts to finely dimensioned nuclear fuel components are the subject of concurrently-filed patent application Ser. No. 13/830,151. Embodiments of such processes will now be described herein.

As previously described, the fuel element 102 is illustrated in FIG. 7. The sapphire components of the fuel element 102 are the cladding tubes 110 and the cladding end caps 112. The sapphire components of the fuel assembly in FIG. 6 are the endplates 104 and the tabs 106. These components are made of single crystal sapphire using edge defined film fed growth methods to produce roughed out and blank components. The rough cladding tubes may have ridges, variability and roughness that are unsuitable for use as is in fuel.

To eliminate the ridges, roughness and variability, the tubes will be high temperature fine formed to produce a tube having uniform internal diameter and uniform wall thickness. This forming will make use of the high temperature creep properties of sapphire that result in it slowly deforming at temperatures around 1700° C. to 2000° C. under sustained high pressure or load. Either or both of two thermal forming processes may be used, namely "thermal creep drawing" and/or "thermal differential expansion moulding".

Thermal creep drawing and thermal creep differential expansion moulding methods disclosed herein differ from conventional tube forming processes in that forming occurs at very high temperatures and relies on the thermal creep properties of an otherwise non-ductile material, sapphire, to achieve the desired part shape.

Thermal Creep Drawing

Thermal creep drawing may be used for fine forming the cladding tubes 110.

Thus:

Step 1 is to heat the rough sapphire tube up to the creep temperature of 1700° C. to 2000° C.

In step 2, the rough sapphire tube is then slowly drawn and/or pushed through a plug and die set to reduce the ridging on the inner and outer surfaces of the roughed tube.

In optional step 3 the tube is allowed to thermally soak at a temperature slightly above the drawing temperature to relieve any work hardening that may have occurred during the drawing process.

In step 4, the tube from step 2 or optional step 3 is drawn or pushed through another plug and die set having slightly tighter internal external diameters to reduce the tube thickness and further reduce ridging.

Steps 2, 3 (as appropriate) and 4 are repeated at successively tighter plug and die sizes until the desired cladding tube finish and hot dimensions are achieved.

Step 5 is a final hot soak to remove any internal stresses from the forming operation.

Step 6 is a slow cooling of the tube to room temperature where its final dimensions and surface uniformity are confirmed by measurement.

The moulding of inner and outer surface may be interspersed, but the last step would be moulding of the inner surface.

Thermal Creep Differential Moulding

Thermal creep differential expansion moulding requires a mould that is made of a material that has a different coefficient of expansion than sapphire and is non-wettable by sapphire. The mould is sized and shaped to give the desired diameters and surface uniformity of the cladding tube when heated to the sapphire creep temperature range of 1700° C. to 2000° C. The internal diameter dimension and surface uniformity are the most critical to fuel element performance, so the exterior of the rough cladding tube is moulded before the internal diameter which therefore is the last step.

Step 1 is to place the rough sapphire tube in the external diameter mould having a lower thermal coefficient of expansion than sapphire, and slowly heat the tube mould assembly to the creep temperature range.

Step 2 is to hold the assembly at the upper end of the creep temperature range for a creep and soak period to allow creep to progress and relieve the stresses from the compression of the sapphire tube by the mould.

Step 3 is to slowly cool the assembly, allowing the sapphire tube to shrink from the mould such that it can be withdrawn at room temperature.

Steps 1, 2 and 3 can be repeated successively with tighter dimension moulds until the cladding tube achieves the desired outer diameter and surface uniformity.

Step 4 is to place the rough sapphire tube in the internal diameter mould, having a higher thermal coefficient of heating than sapphire, and slowly heat the tube mould assembly to the creep temperature range.

Step 5 is to hold the assembly at the upper end of the creep temperature range for a creep and soak period to allow creep to progress and relieve the stresses from the compression of the sapphire tube by the mould.

Step 6 is to slowly cool the assembly, allowing the mould to shrink from the sapphire tube such that is can be withdrawn at room temperature.

Steps 4, 5 and 6 can be repeated with tighter dimension moulds until the cladding tube achieves the desired inner diameter and surface uniformity As in the case of thermal creep drawing described above, forming of the inner and outer surfaces may be interspersed, but the final step will be forming of the inner surface.

The mould may be adapted to apply pressure to form the inner surface or the outer surface of the sapphire, or both surfaces at the same time.

The cladding tubes 110 are subject to the thermal fine forming processes to obtain tight tolerances on the internal diameter and wall thickness. The cladding end caps 112 may be cut from bar stock of ground rods. The endplates 104 may be cut from ground and polished blanks of sheet material. The tabs 106 may be thermally fine formed and/or ground to obtain a smooth bearing surface which, once the fuel assembly is installed in a fuel channel, abuts the inner surface of the fuel channel.

The method of assembly is the same for both of the fuel elements shown in FIGS. 7 and 9, so the assembly will be described using the reference numbers of that shown in FIG. 7.

The fuel elements 102 are assembled by inserting a row of fuel pellets 108 into a cladding tube 110 that is heated to a temperature that allows easy insertion. The pellets 108 are positioned such that there is a controlled distance between the last pellets in the row and the ends of the cladding tube 110. The cladding tube 110 is allowed to cool such that its temperature equalizes with the temperature of the fuel.

The end caps may each comprise a plug (not shown) that inserts into the end of the cladding tube and a rim which has the same diameter as the outer diameter of the cladding tube and abuts the respective end of the cladding tube. (Optionally the end cap may comprise a plug without a rim, or even a flat plate, though the latter is least preferred.) The surfaces of the plugs and rims which will contact the cladding interior and ends, respectively, are coated with a thin layer of aluminium nitride. The end cap is cooled and/or the cladding tube (containing the fuel pellets) is heated to facilitate the insertion of the plugs of the end caps 112 into the cladding tubes 110 while maintaining a controlled gap between the last fuel pellet and the inwardly-facing surface of the end cap 112. The assembly then is allowed to cool or heat, as the case may be, to ambient.

A localized infrared heat source, such as a laser, is used to illuminate and heat the aluminium nitride preferentially until its temperature exceeds the melting temperature of sapphire, which then melts the abutting sapphire surfaces. The molten aluminium nitride and sapphire mix forms an aluminium oxy-nitride bond. The source of infrared heating is removed and the bond is allowed to cool and solidify forming a solid joint between the cladding tube and end cap. The resulting assembly is a single fuel element 102.

The spacing between the fuel elements in a fuel bundle assembly can be maintained by spacer pads attached to the fuel element cladding tube 110. The spacer pads would be made from edge defined film fed growth sapphire rod that is cut to the required thickness of the spacer. The face of the spacer that is to be attached to the cladding tube would be coated with aluminium nitride. The spacer would be joined to the cladding tube using the same infrared heating method as used to join the end caps to the cladding tube.

A fuel bundle 100 is made by assembling the desired number and size of fuel elements 102 in a fixture that sets the fuel bundle geometry.

End plates 104 which hold the bundle of fuel elements 102 are coated with aluminium nitride on one face and the end plate is placed in the assembly fixture such that the aluminium nitride coated face abuts each of the fuel element end caps. A localized infrared heat source such as a laser is used to illuminate and heat each of the aluminium nitride coated end plates at its interface with respective fuel element end caps. The heating progresses until the aluminium nitride coated surfaces of the end plate and contacting fuel element end cap surface begin to melt. The molten aluminium nitride and sapphire mix forms an aluminium oxy-nitride bond. The source of infrared heating is removed and the bond is allowed to cool and solidify forming a solid joint between the end plate and fuel element end caps.

The last step in fuel bundle 100 assembly is to join the tabs 106 to the outer ring of elements 102. The tabs are made from edge defined film fed growth sapphire grown in a cylindrical shell segment form. The tabs are placed at intervals as illustrated in FIG. 6. The tabs are joined with the outer ring of fuel elements using the infrared heating process described for joining the end caps to the cladding tubes. The aluminium nitride required for the infrared absorption and bond is applied to the joint location on the outer elements. Once all of the tabs have been attached, their respective outer surfaces are ground and polished to produce a smooth and accurate outer diameter profile for the bundle.

It is to be kept in mind that the foregoing descriptions of specific embodiments and modifications thereto, and attached Figures, are presented by way of example only and should not be construed as limiting the inventive concept to any particular physical configuration or process. It is to be clearly understood that the scope of the present invention is limited only by the appended claims.

The invention claimed is:

1. A nuclear reactor core of the pressure tube kind in which a plurality of pressure tubes extend through a tank containing, in normal use, heavy water moderator, each of said plurality of pressure tubes comprising:
a plurality of fuel elements held together in spaced relationship so as to permit the flow of coolant through spaces between adjacent fuel elements during normal operation, and
each of said fuel elements comprising a plurality of fuel pellets in a cladding comprising sapphire.

2. A nuclear reactor core according to claim 1, wherein the plurality of fuel elements form a bundle, said reactor core further comprising a plurality of support tabs secured to an outermost ring of the bundle of fuel elements to support the bundle in the pressure tube, the tabs comprising sapphire.

3. A nuclear reactor core according to claim 1, wherein each fuel element comprises fuel pellets in tubular cladding closed at each end with end caps.

4. A nuclear reactor core according to claim 3, wherein the tubular cladding and end caps are made of the same material.

5. A nuclear reactor core according to claim 4, wherein the end caps are joined to respective ends of the cladding by an aluminium oxy-nitride bond between respective juxtaposed surfaces of the cladding and end caps.

6. A nuclear reactor core according to claim 1, wherein the sapphire comprises single crystal sapphire.

7. The nuclear reactor core of claim 6 wherein the single crystal sapphire comprises an edge defined film fed growth formation.

8. The nuclear reactor core of claim 1 wherein each of said plurality of pressure tubes comprises a protective insulator sleeve comprising fused silica.

9. The nuclear reactor core according to claim 8, wherein the insulator sleeve has an interior liner or coating of sapphire.

10. A nuclear reactor core in which a plurality of pressure tubes extend through a tank containing, in normal use, heavy water moderator, each of said plurality of pressure tubes comprising: a plurality of fuel elements held together in spaced relationship so as to permit the flow of coolant through spaces between adjacent fuel elements during normal operation, and a protective insulator sleeve comprising fused silica, the fuel elements comprising fuel pellets in a cladding comprising sapphire.

11. A nuclear reactor core according to claim 10, wherein the insulator sleeve has an interior liner or coating comprising sapphire.

12. A nuclear reactor core according to claim 10, wherein the plurality of fuel elements form a bundle, said reactor core further comprising a plurality of support tabs secured to an outermost ring of the bundle of fuel elements to support the bundle in the pressure tube, the tabs comprising sapphire.

13. A nuclear reactor core according to claim 10, wherein the cladding is tubular and is closed at each end with end caps.

14. A nuclear reactor core according to claim 13, wherein the tubular cladding and end caps are made of the same material.

15. A nuclear reactor core according to claim 14, wherein the end caps are joined to respective ends of the cladding by an aluminium oxy-nitride bond between respective juxtaposed surfaces of the cladding and end caps.

16. A nuclear reactor core according to claim 15, wherein the sapphire comprises single crystal sapphire.

17. The nuclear reactor core of claim 16 wherein the single crystal sapphire comprises an edge defined film fed growth formation.

18. A fuel element for use in a nuclear reactor core in which a plurality of fuel elements are held together in spaced relationship so as to permit the flow of coolant through spaces between said plurality of fuel elements during normal operation, the fuel element comprising a plurality of fuel pellets in a cladding comprising sapphire.

19. A fuel element according to claim 18, wherein the cladding comprises tubular cladding closed at each end with end caps.

20. A fuel element according to claim 19, wherein the tubular cladding and end caps are made of the same said material.

21. A fuel element according to claim 20, wherein the end caps are joined to respective ends of the cladding by an aluminium oxy-nitride bond between respective juxtaposed surfaces of the cladding and end caps.

22. A fuel element according to claim 18, wherein the cladding material comprises single crystal sapphire.

23. The fuel element according to claim 22, wherein the single crystal sapphire of the cladding comprises an edge defined film fed growth formation.

\* \* \* \* \*